United States Patent [19]

Arita et al.

[11] Patent Number: 5,581,242

[45] Date of Patent: Dec. 3, 1996

[54] AUTOMATIC ALARM DISPLAY PROCESSING SYSTEM IN PLANT

[75] Inventors: Setsuo Arita, Hitachiota; Yukiharu Ohga, Katsuta; Takaharu Fukuzaki, Hitachi; Koichi Kawaguchi, Hitachi; Hiroyuki Yuchi, Hitachi; Tetsuo Ito, deceased, late of Hitachi, all of Japan, by Kazuko Ito, successor

[73] Assignee: Hitachi, Ltd., Tokyo, Japan

[21] Appl. No.: 329,373

[22] Filed: Oct. 25, 1994

Related U.S. Application Data

[63] Continuation of Ser. No. 933,316, Aug. 21, 1992, abandoned.

[30] Foreign Application Priority Data

Aug. 22, 1991 [JP] Japan ..................................... 3-210643
Jan. 8, 1992 [JP] Japan ..................................... 4-018367

[51] Int. Cl.$^6$ ........................................................ G08B 3/00
[52] U.S. Cl. ........................... 340/691; 340/517; 395/50
[58] Field of Search ............................. 340/691, 679, 340/519, 522, 524, 525, 825.5, 825.51, 517, 523; 395/50–51, 60, 62, 906, 907, 914, 915

[56] References Cited

U.S. PATENT DOCUMENTS 5,021,992  6/1991  Kondo ........................................ 395/54
5,167,010  11/1992  Elm et al. .................................. 395/50
5,175,797  12/1992  Funabashi et al. ................... 395/61 X

FOREIGN PATENT DOCUMENTS 282505  11/1988  Japan .
12395  1/1989  Japan .
91211  4/1989  Japan .

OTHER PUBLICATIONS

Yamada et al., "A Plant Diagnosis Method Based on the Knowledge of System Description", *Journal of Information Processing*, vol. 7, No. 3, pp. 143–148, Nov. 1984.

*Primary Examiner*—Thomas Mullen
*Attorney, Agent, or Firm*—Antonelli, Terry, Stout & Kraus

[57] ABSTRACT

An alarm system in a plant for outputting a plurality of alarms with respect to devices constituting the plant and monitor information with respect to the devices. In the system, there is provided a unit for storing a table for correspondingly relating a plurality of alarm items to suppression reason items indicating that the display of the alarms can be suppressed. A generated alarm item and a generated event are specified by receiving the plurality of alarms and monitor information. A decision is made by reference to the table as to whether the generated alarm suppression reason item exists in the monitor information, the kind of generated alarm, and the generated event for each generated alarm item. An instruction is given to a display unit to suppress the display of alarms in which a decision is made that the suppression reason item exists.

13 Claims, 15 Drawing Sheets

FIG. 4

```
AN001
         CLASS            SYSTEM
         ALARM NUMBER     1             (DATA TYPE INTEGER)
         CAUSE ALARM      {"XXXXX"}     (CHARACTER-STRING SET)
         UPPER ALARM      {"AN005"}     (CHARACTER-STRING SET)
         DEVICE STATE     {"XXXXX"}     (CHARACTER-STRING SET)
         PROCESS QUANTITY {"XXXXX"}     (CHARACTER-STRING SET)
         GENERATED EVENT  {"EV001"}     (CHARACTER-STRING SET)

:                :             :                      :
         :                :             :                      :

AN005
         CLASS            SYSTEM
         ALARM NUMBER     5             (DATA TYPE INTEGER)
         CAUSE ALARM      {"XXXXX"}     (CHARACTER-STRING SET)
         UPPER ALARM      {"XXXXX"}     (CHARACTER-STRING SET)
         DEVICE STATE     {"XXXXX"}     (CHARACTER-STRING SET)
         PROCESS QUANTITY {"XXXXX"}     (CHARACTER-STRING SET)
         GENERATED EVENT  {"XXXXX"}     (CHARACTER-STRING SET)

:                :             :                      :
         :                :             :                      :

EV001
         CLASS            SYSTEM        (DATA TYPE INTEGER)
         EVENT NUMBER     1

:                :             :                      :
         :                :             :                      :
         ↑                ↑             ↑                      ↑
       FRAME           SLOT           VALUE                DATA TYPE
       NAME            NAME
```

FIG. 7

| ITEM / ALARM NAME | ALARM NUMBER | GENERATION/ NOT-GENERATION | SUP-PRESSED ON/OFF | RESULT GENER-ATION MONITOR COUNTER | SUPPRESSION REASON INFORMATION | | | | | DECISION CON-DITIONS |
|---|---|---|---|---|---|---|---|---|---|---|
| | | | | | KIND OF INFOR-MATION | ALARM | DEVICE STATE | PROCESS STATE | EVENT | |
| ANN-1 | 1 | 0 | 0 | 1 | a | ANN-11 | | | | ① |
| | | | | | c | | ST-21-x | | | ① |
| | | | | | c | | ST-22-x | | | ① |
| | | | | | e | | | PV-31-x | | ① |
| | | | | | f | | | | EV-41 | ① |
| ANN-2 | 2 | 0 | 1 | 0 | a | ANN-3 | | | | ② |
| ANN-3 | 3 | 1 | 0 | 0 | b | ANN-1 | | | | ① |
| .... | .... | .... | .... | .... | .... | .... | .... | .... | .... | .... |

ANN-n : ALARM NAME
ST-n : DEVICE NAME
PV-n : PROCESS SIGNAL NAME
EV-n : EVENT NAME
X INDICATES STATE

DECISION CONDITIONS
① : ALARM GENERATION TIME ≧ SUPPRESSION REASON GENERATION TIME
② : ALARM GENERATION TIME ≦ SUPPRESSION REASON GENERATION TIME

GENERATION/NOT-GENERATION ...... 1 : GENERATION
                                 0 : NOT-GENERATION
SUPPRESSED ON/OFF ...... 1 : ON
                         0 : OFF
RESULT GENERATION MONITOR COUNTER ...... >0 : MONITORING
                                         =0 : NOT-MONITORING

KIND OF INFORMATION
a : CAUSE ALARM
b : RESULT ALARM
c : CAUSE DEVICE STATE
d : RESULT DEVICE STATE
e : CAUSE PROCESS SIGNAL STATE
f : CAUSE EVENT

FIG. 11

| ALARM ITEM | CAUSE ALARM | UPPER ALARM | DEVICE STATE | PROCESS QUANTITY | GENERATED EVENT |
|---|---|---|---|---|---|
| AN001 | | AN005 | | | EV001 |
| AN002 | AN003<br>AN007 | | ST001 | | EV001 |
| AN003 | AN010 | | | PV001 | EV002 |
| ..... | ..... | ..... | ..... | ..... | ..... |

[SAVE]  [CORRECTION]

AUTOMATIC ALARM DISPLAY PROCESSING SYSTEM IN PLANT

This application is a continuation of application Ser. No. 07/933,316, filed Aug. 21, 1992, now abandoned.

BACKGROUND OF THE INVENTION

The present invention relates to a plant operation monitoring system, and particularly relates to an alarm display processing system for automatically selecting important alarms among a large number of alarms generated from the monitoring system and displaying the important alarms, and also relates to an apparatus for giving alarm selection standards to the system.

In various types of large-scaled plants such as a nuclear power plant, a chemical plant, a thermal power plant, a hydraulic power plant and the like, various systems are provided for the safe and stable operation of plant. As one of the systems, an alarm display processing system is an important system having a function of displaying the abnormal state of the plant. When, for example, a failure arises in a nuclear power plant, the alarm display processing system may output hundreds of alarms almost simultaneously correspondingly to the degree of the failure. Even in the case where such a large number of alarms are generated, an operator must judge experimentally the most important alarm among the large number of alarms at that point of time.

If, in this case, an alarm display processing system having a function of judging truly important alarms to display them without display of other alarms derived therefrom can be provided, the operator can grasp the state of the plant easily so that the system is very useful to the operator.

For example, in the case of a technique described in JP-A-64-12395, when alarms are generated, important alarms are decided by retrieving the cause and result of alarm generation from a knowledge base constituted by knowledge with respect to the attributes of alarms and knowledge with respect to the cause of alarm generation and the importance of alarms.

For example, in the case of a technique described in JP-A-63-282505, when a signal indicating plant abnormality is generated, an alarm corresponding to an initial event as the cause of signal generation is generated through deciding the initial event to guide an operating rule corresponding to the initial event to the operator.

In the technique described in JP-A-64-12395, important alarms are retrieved from generation alarms by an inference function. If the inference mechanism is operated to judge important alarms, a large processing time is required so that important alarms are not outputted just after the generation of alarms but are outputted after the passage of time of from the order of several seconds to the order of tens of seconds. This time lag is undesirable because the operator must grasp the state of plant just after the generation of alarms. Furthermore, in the conventional technique, the degrees of importance of alarms are set preliminarily but the degrees of importance may be changed according to the state of plant. There arises a problem in that it is impossible to set the degrees of importance to all alarms preliminarily.

In the technique described in JP-A-63-282505, the initial event is specified so that alarms other than alarms corresponding to the initial event are suppressed as derivative alarms. It is however difficult to specify the initial event at the time of occurrence of abnormality, because the initial event can be generally found by examination after the failure plant is stopped. Of course, if the initial event can be specified at the time of occurrence of abnormality to thereby generate an alarm corresponding to the initial event, a very excellent alarm processing system may be provided. In the present state, the initial event is obtained by an inference function in the same manner as the conventional technique, so that there arises a problem in that an impractically large time is required.

As one of conventional techniques, a system for deciding the initial event after deciding the correspondence of cause and result between alarms at the time of occurrence of abnormality in plant has been described in JP-A-64-91211.

SUMMARY OF THE INVENTION

An object of the present invention is to provide an automatic alarm display processing system in which not only important information is outputted speedily but derivative alarms are suppressed when a failure arises in plant.

The present invention provides a computerized automatic alarm display processing system in a plant which outputs a plurality of alarms with respect to constituent parts of the plant and monitor information obtained from monitoring respective constituent parts of the plant. In the system of the invention, there is provided a unit for storing a table for correspondingly relating a plurality of alarms to alarm suppression reason information indicating that the display of the alarms are to be suppressed if the reasons for suppression of the alarms are detected. The alarms each represent an event where erroneous operation in the plant has occurred. A generated alarm or a generated event are detected based on monitor information; a decision is made by reference to the table to determine whether alarm suppression reason information corresponding to the generated alarm exists in the monitor information; and an instruction is given to a display unit to suppress the display of the generated alarm when a decision is made that the alarm suppression reason information exists.

The above-described table is provided for correspondingly relating a plurality of alarms to alarm suppression information. The alarm suppression reason information indicates that the display of the alarms related thereto by the table are to be suppressed if another alarm has occurred. Thus the table is used to decide whether an alarm is to be displayed permitting only important alarms to be displayed from among a plurality of alarms in a short time. The table is provided by on-line processing in the automatic alarm display system. Thus, the display of other alarms is suppressed without use of any inference function which takes a long processing time.

BRIEF DESCRIPTION OF THE DRAWINGS

FIG. 4 is a view showing an example of display of information with respective to alarm attributes;

FIG. 7 is a view of a causal relation table to be employed in the invention;

FIG. 11 is a view showing an example of display of a causal relation table;

DESCRIPTION OF THE PREFERRED EMBODIMENTS

An embodiment of the present invention will be described hereunder with reference to the drawings.

Figure 1:
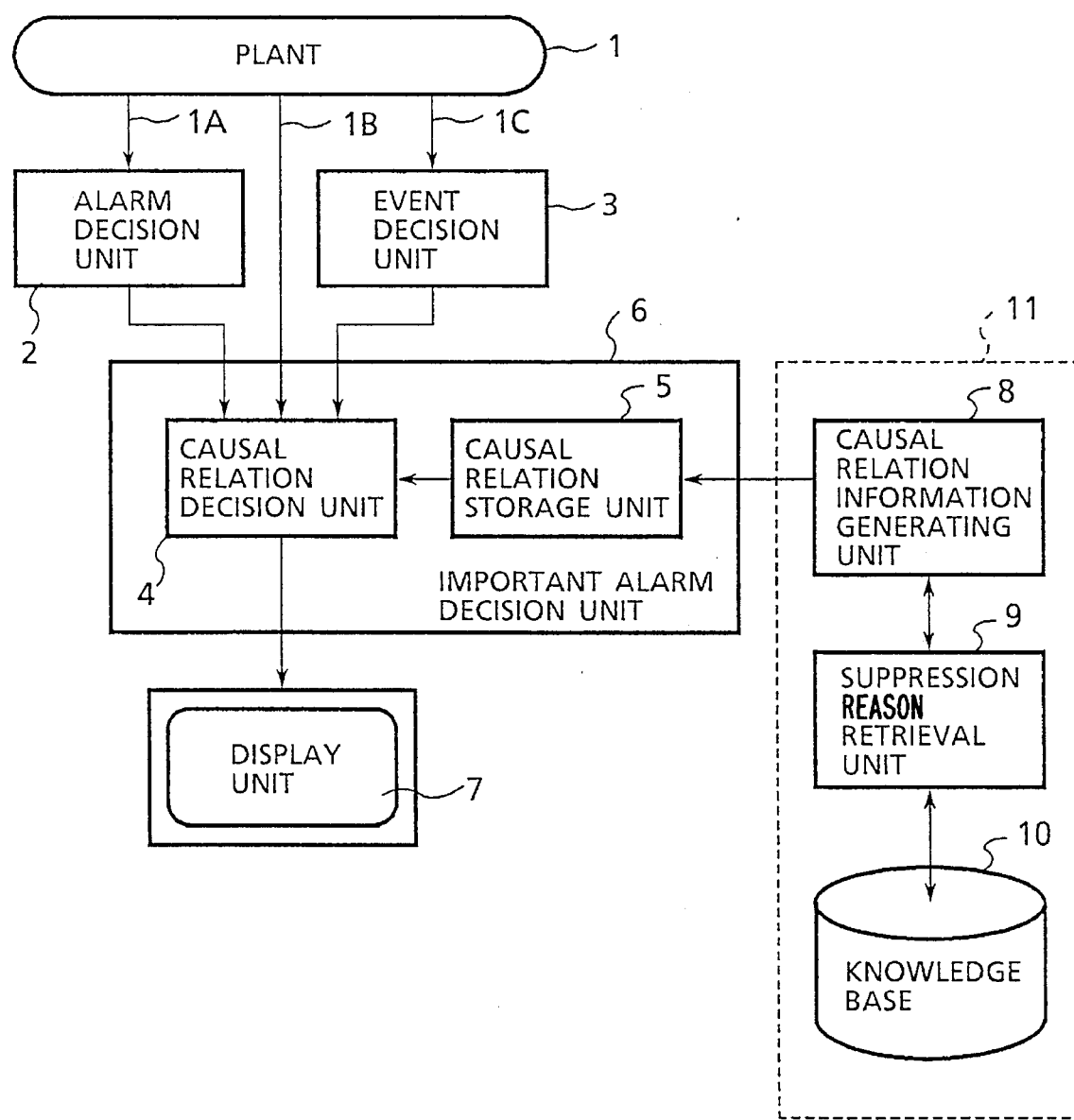
FIG. 1 is a block diagram of an alarm display processing system according to the present invention.

FIG. 1 is a configuration diagram of an alarm processing system as an embodiment of the present invention. An alarm processing system of this embodiment in which the state of plant 1 as an object to be monitored is monitored so that alarms can be generated when abnormality occurs, includes an alarm decision unit 2, an event decision unit 3, an important alarm decision unit 6, a display unit 7, and an off-line processing unit 11 connected to the important alarm decision unit 6 in an off-line state. The important alarm decision unit 6 includes a causal relation decision unit 4, and a causal relation storage unit 5. The off-line processing unit 11 includes a causal relation information generating unit 8, a suppression reason retrieval unit 9, and a knowledge base 10.

Monitor signals 1A, 1B and 1C constituted by process signals, device state signals and the like are outputted from the plant 1 as an object to be monitored. The important alarm decision unit 6 fetches an output signal of the alarm decision unit 2 based on the monitor signal 1A outputted from the object 1, and an output signal of the event decision unit 3 based on the monitor signals 1B and 1C outputted from the object 1. The causal relation decision unit 4 in the important alarm decision unit 6 judges on the basis of these input signals whether causal relation information preliminarily stored in the causal relation storage unit S is generated or not. In the case where a decision is made that alarm suppression reason information expressed by causal relation information is generated with respect to generated alarms, the generated alarms are suppressed on the basis of the information so that other generated alarms not suppressed are outputted as important alarms on the display unit 7.

Specifically, the monitor signal 1A is constituted by alarm signals from various constituent devices of the plant 1. In the case of nuclear power plant, examples of the alarm signal 1A include a "low water level" signal, a "very low water level (indicating a water level lower than the low water level)" signal indicating the water level of a reactor, and the like. Specifically, the monitor signal 1B is constituted by signals indicating the values of device operating parameters and the on/off state of the devices. Examples of the monitor signal 1B include analog signals indicating the value of water quantity, the value of pressure and the value of temperature, and digital signals indicating the on/off state of pump operation and the opening/shutting of valves. Specifically, the monitor signal 1C is constituted by signals indicating the changes of device parameters with time. The causal relation information is constituted by an alarm and alarm suppression reason information indicating that the alarm display is to be suppressed. A technique for processing alarm signals in nuclear power plant has been disclosed in co-pending U.S. patent application Ser. No. 07/628,329 filed Dec. 17, 1990 by the same inventors of the present application. U.S. patent application Ser. No. 07/628,329 field Dec. 17, 1990 was abandoned in favor of continuation application Ser. No. 08/425,334 filed Apr. 18, 1995. A part of the technique disclosed in the above-noted applications can be employed in the embodiment of the present invention.

The causal relation storage unit 5 acquires causal relation information preliminarily generated by the causal relation information generating unit 8 of the off-line processing unit 11 and stores it. That is, display alarm suppression reason information for each alarm is generated preliminarily by the off-line processing unit 11 and transferred to the causal relation storage unit 5 so that causal relation information is stored in the causal relation storage unit 5 in the form of a causal relation information table with respect to one-to-one correspondence between alarms and alarm suppression reasons to facilitate deciding by the causal relation decision unit 4. In the case of a nuclear power plant, the number of alarms may reach one thousand but systems constituting the plant are so respectively individual that alarms are generated substantially individually for each system. Accordingly, the causal relation is not always established with respect to all alarms but the causal relation is established with respect to alarms in one system. Accordingly, causal relation information indicating the causal relation with respect to alarms can be generated and stored preliminarily for each alarm item.

In the off-line processing unit 11, the causal relation information generating unit 8 first outputs an alarm preliminarily set by a user, to the suppression reason retrieval unit 9. The suppression reason retrieval unit 9 retrieves alarm suppression reason information with respect to the set alarm from the knowledge base 10 and outputs it to the causal relation information generating unit 8. The causal relation information generating unit 8 arranges the alarm suppression reason information by alarms, generates causal relation information indicating the correspondence of causal relation between each alarm and alarm suppression reason information on the basis of a predetermined rule of suppression reason decision and outputs the causal relation information to the causal relation storage unit 5. As described above, the causal relation storage unit 5 can store preliminarily the causal relation information indicating the correspondence of causal relation with respect to alarms. FIG. 7 is a structural view of a causal relation information table stored in the causal relation storage unit 5. As shown in FIG. 7, suppression reasons with respect to alarms in the causal relation information are defined in the form of a causal relation table so that a decision can be made easily by looking-up means as to whether a generated alarm is to be suppressed or not.

All the units except the plant 1 and the display unit 7 shown in FIG. 1 can be constituted by an available computer, so that the operation thereof can be controlled according to a program stored in the computer.

Figure 2:
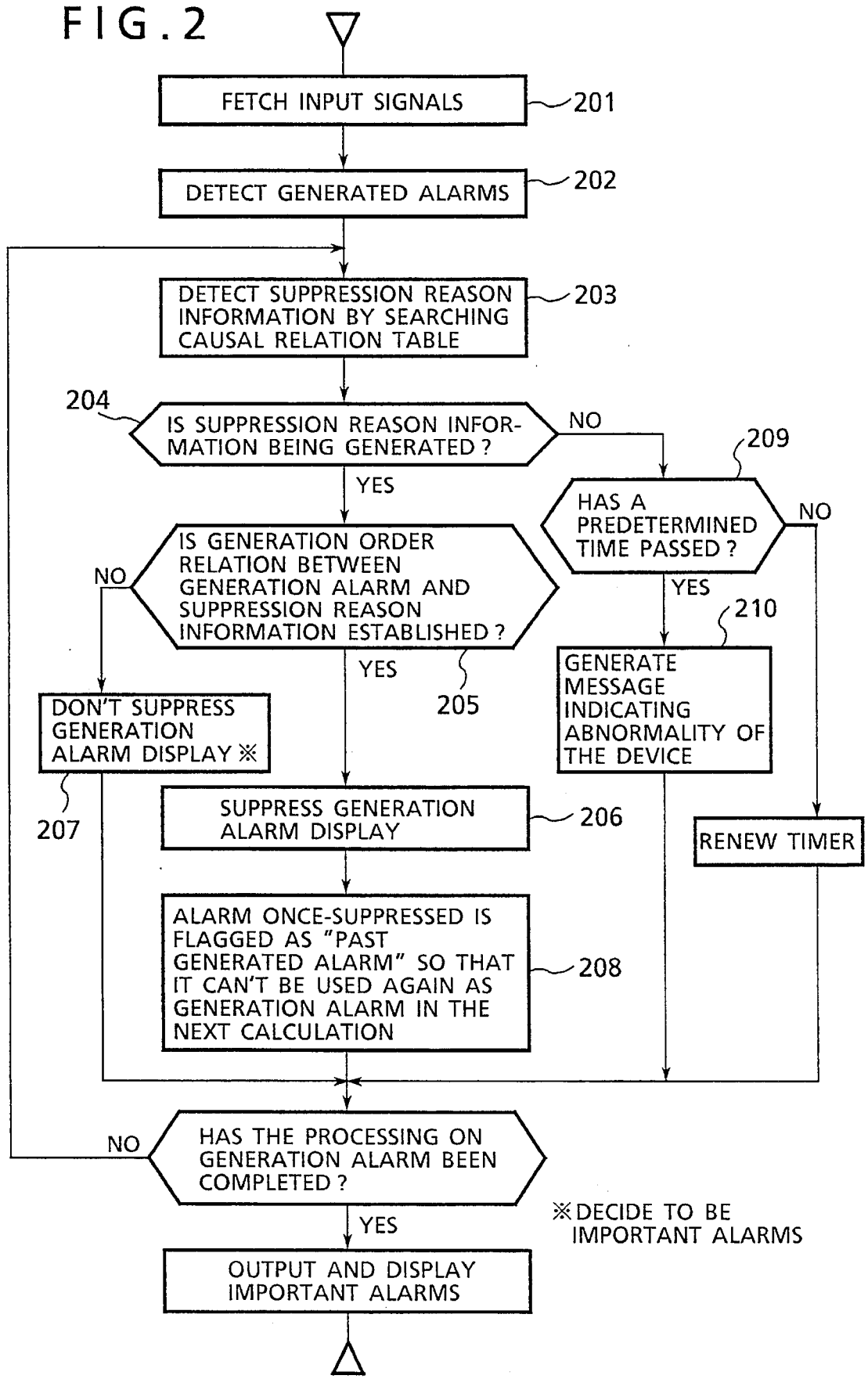
FIG. 2 is a flow chart for explaining the operation of the alarm display processing system according to the invention.

FIG. 2 is a flow chart showing the operating procedure of the alarm display processing system depicted in FIG. 1. In a step 201, input signals, that is, monitor signals 1A, 1B and 1C are fetched from the plant and a decision is made whether there is any alarm to be generated among these input signals. That is, the monitor signals 1A, 1B and 1C are supplied to the alarm decision unit 2, the event decision unit 3 and the causal relation decision unit 4, respectively. In the case where the monitor signal 1A does not satisfy the decision reference level or in the case where the monitor signal 1A expresses a device state in which the device does not operate normally, the alarm decision unit 2 generates an alarm signal and supplies the signal to the causal relation decision unit 4. In the case where the change pattern of the monitor signal 1C with time is shifted from a reference pattern, the event decision unit 3 generates an alarm signal and supplies the signal to the causal relation decision unit 4. Units disclosed in the copending U.S. patent application Ser. No. 07/628,329 can be used as the alarm decision unit 2 and the event decision unit 3.

The causal relation decision unit 4 fetches the alarm signals and the monitor signal 1B and detects in a step 202 whether there is any generated alarm or not.

In a step 203, the causal relation decision unit 4 detects alarm suppression reason information by searching the causal relation table (FIG. 7) stored in the causal relation storage unit 5 based on the generated alarm. In a step 204, the causal relation decision unit 4 decides whether the alarm suppression reason information corresponding to the generated alarm has been generated among the input signals. In the case where suppression reason information has been generated among the input signals, a decision is made in a step 205 as to whether the generation order of the generated alarm and the alarm suppression reason information has a predetermined relation. In the case where the generation order has a predetermined relation, in a step 206, the display of the generated alarm is suppressed on the basis of the alarm suppression reason information. That is, the generated alarm is an alarm derived from an important alarm, so that the generated alarm need not be displayed. In the case where the generation order does not have a predetermined relation, in a step 207, a decision is made in step 207 that the generated alarm is important information to be outputted. When the suppressed alarms not outputted are successively used as generated alarms subjected to arithmetic operations, the number of alarm suppressing processes increases as the generated alarms increase. This causes a barrier to high-speed processing. Therefore, in a step 208, an alarm once suppressed is flagged as a "past generated alarm" so that it cannot be used again as a generated alarm before the suppression processing is reset. Accordingly, the alarm flagged as a "past generated alarm" in the generated alarm detection processing is not regarded as a generated alarm.

In the case where suppression reason information with respect to the generated alarm is not generated in a predetermined time, in a step 209, a message that abnormality occurs in the device is generated. As the case where a device interlocking operation is provided, it is assumed now that interlocking is set so that a device A is operated when a device B operates and that an alarm ANN-A indicating the operation of device A and an alarm ANN-B indicating the operation of device B are set. In this case, the operation of the device A necessarily causes the operation of the device B. so that the alarm ANN-B is necessarily generated after the alarm ANN-A is generated. Accordingly, if the alarm ANN-B is not generated in a predetermined time after the alarm ANN-A is generated, this state is judged to be abnormal. Accordingly, in such a case, a message that the alarm ANN-B is not generated is outputted/displayed in a step 210. This message, together with the important alarm, is supplied to the display unit 7.

The judgment as to whether alarm suppression reason information in FIG. 7 is generated or not is made in accordance with the following standards.

(1) With respect to the alarm signal, the judgment is made on the basis of the condition as to whether there is any set alarm generated.

(2) With respect to the device state signal and the process signal, the judgment is made on the basis of the condition as to whether the state of each set signal takes a predetermined value.

(3) With respect to the event, the judgment is made on the basis of the condition as to whether the result obtained by the event decision unit 3 is a set event.

The flow chart of FIG. 2 will be described hereunder corresponding to FIG. 7. It is assumed now that an alarm name ANN-3 is detected by generation alarm detection processing. An alarm name ANN-1 as an alarm suppression reason of the alarm name ANN-3 is registered in the causal relation table in FIG. 7. When the alarm name ANN-1 is generated in the condition that the alarm name ANN-3 is generated, the alarm name ANN-3 is a result alarm derived from the alarm name ANN-1 which is a cause alarm. If the alarm name ANN-3 is outputted, unnecessary information is given to a plant operator. Accordingly, the information (the alarm name ANN-3) is suppressed from outputting. Therefore, a judgment is made as to whether the cause alarm ANN-1 as an alarm suppression reason is generated or not. In the case where a decision is made that the alarm name ANN-1 is not generated, monitoring is then made as to whether the alarm name ANN-1 is generated in a predetermined time. The monitoring is made by a result generation monitor counter. If the alarm ANN-1 is generated in a predetermined time, the alarm name ANN-1 suppresses the alarm ANN-3 from outputting. According to the causal relation table in FIG. 7, a judgment as to whether the alarm ANN-1 can be suppressed or not is made by the logical conditions of an alarm ANN-11, a device state ST-21-X, a device state ST-22-X, a process state PV-31-X and an event EV-41. FIG. 7 also shows that the display of an alarm ANN-2 is suppressed by the fact that the alarm ANN-3 is generated.

A method for generating the causal relation table in FIG. 7 will be described hereunder.

Figure 3:
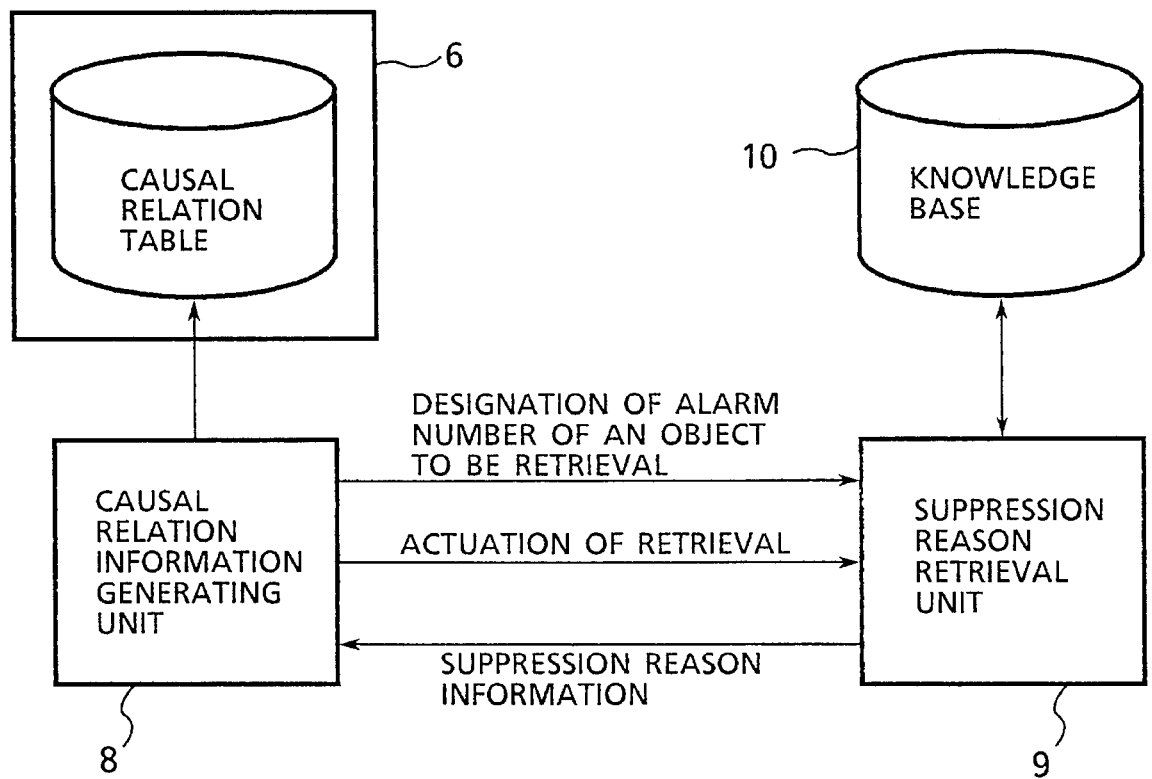
FIG. 3 is a view for explaining a method of generating a causal relation table.

FIG. 3 is an explanatory diagram specifically showing a process of generating the causal relation table. In FIG. 3, knowledge of alarm suppression reason information stored in the knowledge base 10 is expressed by a frame structure as shown in FIG. 4. This is because expression is simple and because addition or correction of knowledge is easy.

The causal relation information generating unit 8 operates the suppression reason retrieval unit 9 to acquire suppression reason information and then generates a causal relation table shown in FIG. 7 on the basis of the information. An alarm name may be used in the retrieval or an alarm number preliminarily decided may be used in the retrieval. In this embodiment, an alarm number is used to make the retrieval easy. The suppression reason retrieval unit 9 retrieves alarm suppression reason information with respect to the alarm designated by the alarm number from the knowledge base 10 and returns this result to the causal relation information generating unit 8.

Figure 5B:
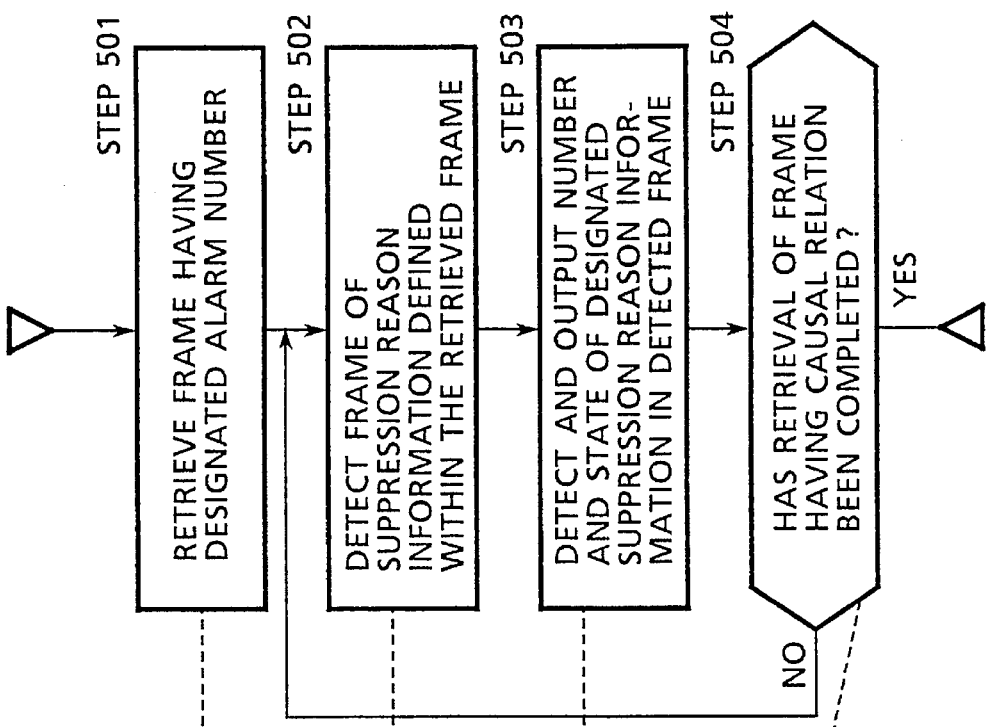
FIGS. 5A and 5B are flow charts showing the causal relation table generating procedures.
Figure 5A:
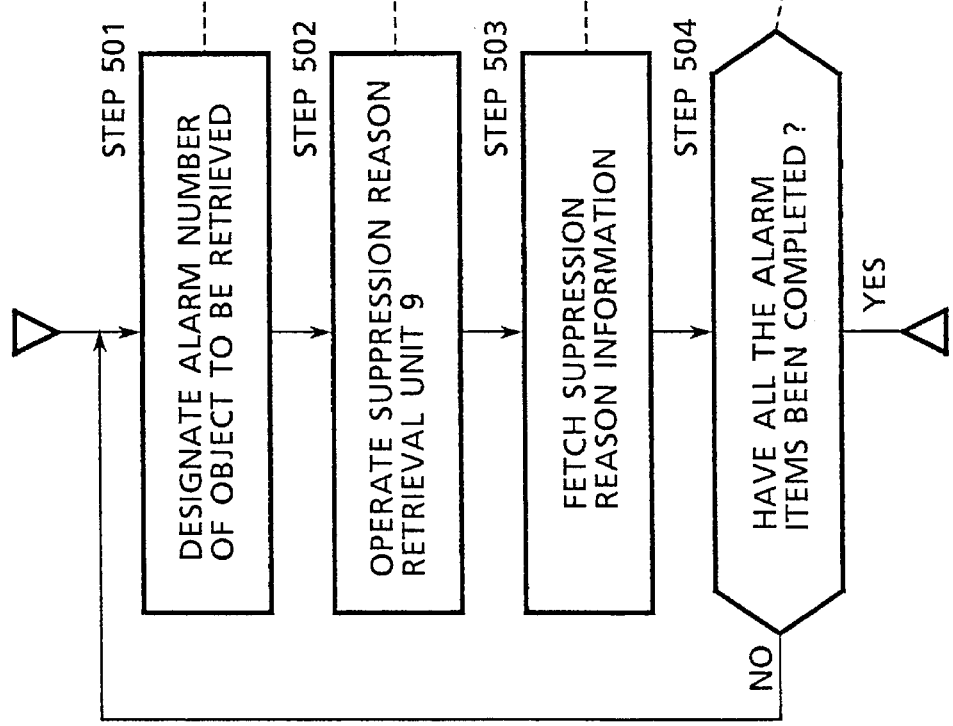

These procedures will be described hereunder. FIGS. 5A and 5B are flow charts relatively showing the procedures of the causal relation information generating unit 8 and the suppression reason retrieval unit 9.

As shown in FIG. 5A, in step 501, the causal relation information generating unit 8 sets alarm number as a retrieval object to the suppression reason retrieval unit 9. In step 502, the suppression reason retrieval unit 9 is started. As a result, the suppression reason retrieval unit 9 outputs alarm suppression reason information by the procedure shown in FIG. 5B. In step 503, the causal relation information generating unit 8 fetches the suppression reason information outputted from the suppression reason retrieval unit 9. The aforementioned procedures are carried out on all alarms to generate a causal relation table as shown in FIG. 7.

The procedure of the suppression reason retrieval unit 9 will be described hereunder with reference to an example of knowledge shown in FIG. 4. In FIG. 4, an alarm AN001 shows the case where the alarm number is "1" and the alarm as an alarm suppression reason is AN005. Further, an alarm AN005 shows the case where the alarm number is "5". First in a step 501, the suppression reason retrieval unit 9 fetches the alarm number 1 set by the causal relation information generating unit 8 and then detects a frame number AN001 expressing the alarm number "1" by searching all the frame names. Then, in a step 502, a judgment is made whether the frame name AN001 includes alarm suppression reason information such as a cause alarm, a result alarm, an upper alarm and a lower alarm. In this example, the cause alarm AN005 is selected. The terminology "upper alarm" and "lower alarm" herein used shows alarms multistageously set with respect to one process quantity so that the "upper alarm" means a higher-level alarm in the direction of the change of the process quantity. Because the cause alarm AN005 shows a frame name, in a step 503, a classification number 5 of the cause alarm AN005 is detected and outputted as suppression reason information. Although this example shows the case where a cause alarm exists, a judgment may be made by a step 504 to carry out the same procedure as described above in the case where another reason alarm exists. Although the step 503 shows the case where the state and event of suppression reason information may be detected, these correspond to device state, process state and event shown in FIG. 7.

As described above, all alarm suppression reason information for each alarm item is retrieved and outputted from the suppression reason retrieval unit 9 to the causal relation information generating unit 8. Because all frame numbers expressed by alarm numbers are searched particularly in the step 501, all alarm suppression reason information can be retrieved correspondingly to one alarm item even in the case where the alarm suppression reason information is dispersively defined as a plurality of data for one alarm. Accordingly, the plurality of suppression reason data can be arranged by alarm as shown in FIG. 7 even in the case where the plurality of suppression reason data are provided for one alarm item. Accordingly, even in the case where knowledge with respect to alarm suppression reason information is added to an alarm, all alarm suppression reason information including the added information can be retrieved with respect to the alarm.

Figure 6:
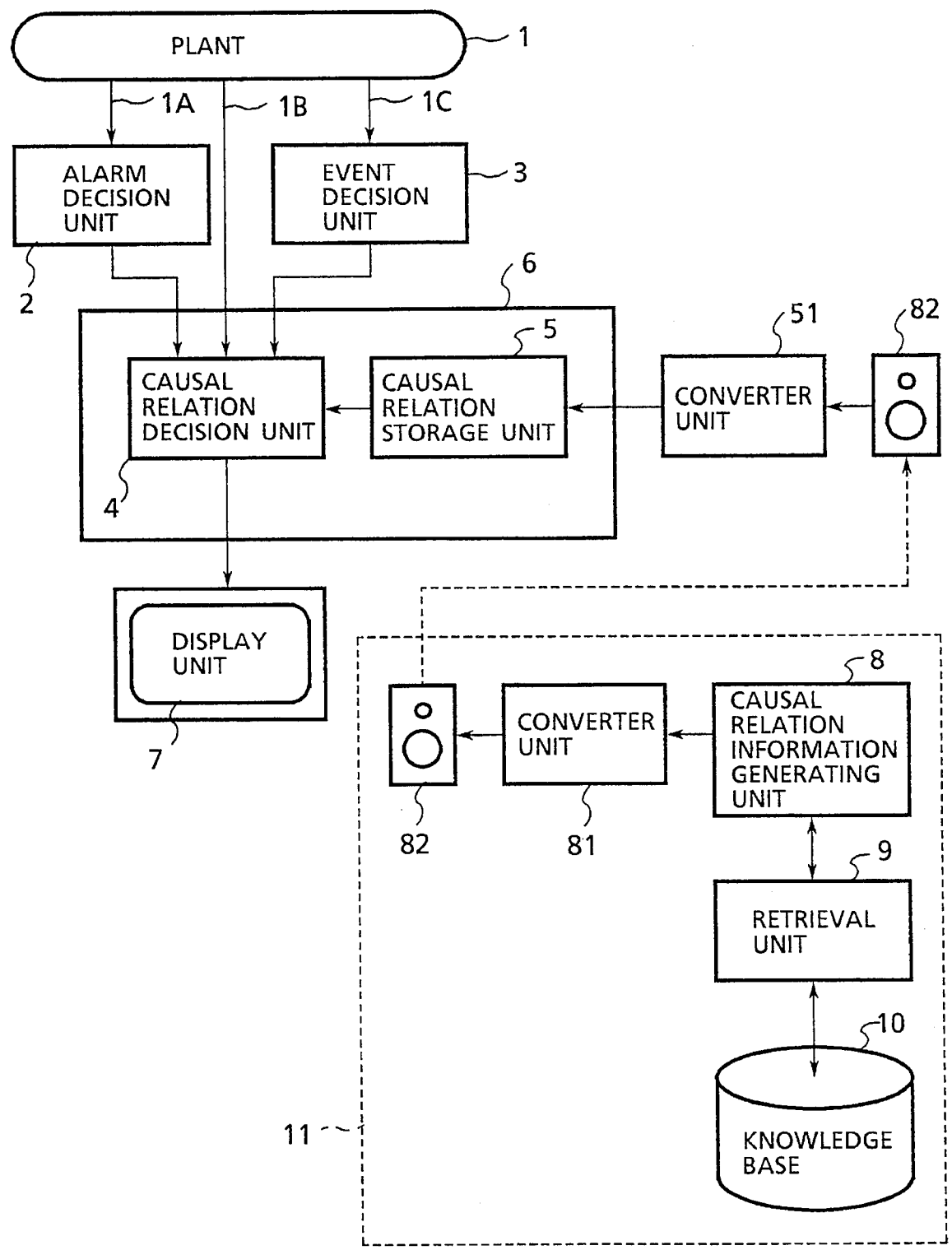
FIG. 6 is a block diagram of an alarm display processing system according to the present invention.

FIG. 6 is a configuration diagram of an alarm processing system as another embodiment of the present invention. This embodiment is different from the embodiment of FIG. 1 in that units 81, 82 and 51 are 1 added to the system of FIG. 1 to store causal relation information generated by the causal relation information generating unit 8 of the off-line processing unit 11 in the causal relation storage unit 5. In FIG. 6, the causal relation information generated by the causal relation information generating unit 8 is stored in a portable information medium such as a floppy disk 82 through a converter unit 81. The floppy disk 82 is carried to the position of arrangement of the converter unit 51 connected to the important alarm decision unit 6, so that the causal relation information stored in the floppy disk 82 is read by the converter unit 51 and outputted to the causal relation storage unit 5. In this configuration, causal relation information renewed can be stored easily in the causal relation storage unit 5 as occasion demands even in the case where the off-line processing unit 11 and the important alarm decision unit 6 are placed in physically different positions. Expect floppy disk, examples of the portable information medium include magnetic tape, ROM, integrated circuit, IC card, etc.

In the aforementioned alarm processing system, suppressible alarms with respect to generated alarms are judged by a looking-up means on the basis of causal relation information from the causal relation storage unit at the time of alarm generation, so that the residual part of generated alarms are displayed. Accordingly, alarms derivatively generated can be suppressed just after the alarm generation, so that important alarms can be outputted selectively. Furthermore, alarm, device state, process state and event as suppression reasons for each alarm are assigned as alarm suppression reason information, so that derivative alarms among alarms generated correspondingly to the state of plant can be suppressed efficiently. As a result, truly important alarms at the time of abnormality of plant can be provided just after the alarm generation, so that the plant operator can grasp the state of plant easily to facilitate the appropriate operation of plant.

An embodiment of an alarm display suppression reason information generating system for carrying out the function of the causal relation information generating unit 8 by on-line processing will be described hereunder.

Figure 8:
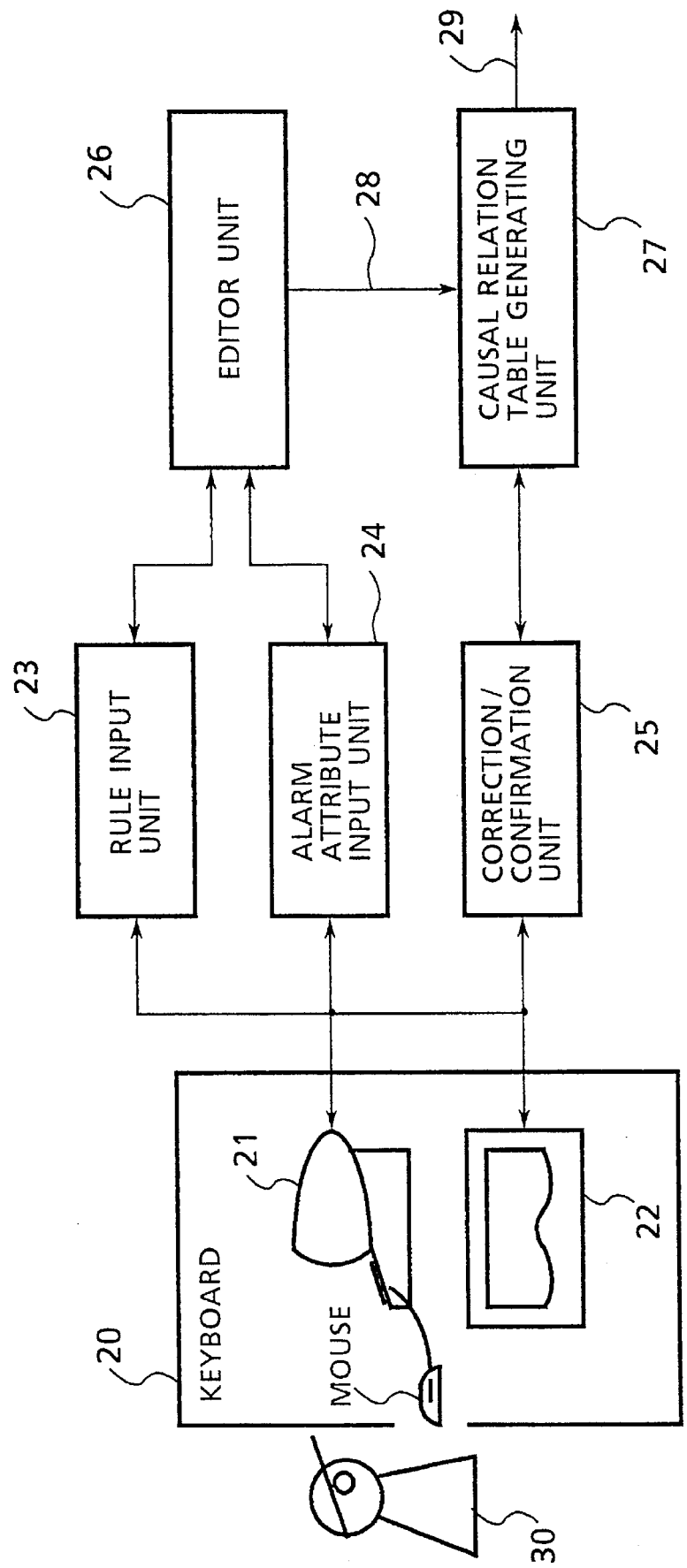
FIG. 8 is a block diagram of an alarm display suppression information generating system according to the invention.

FIG. 8 is a configuration diagram of an embodiment of an alarm display suppression information generating system according to the present invention. The configuration and operation of the system will be described hereunder.

The alarm display suppression information generating system includes an alarm display suppression rule input unit 23, an alarm attribute input unit 24, a correction/confirmation unit 25, an editor unit 26, a causal relation table generating unit 27, and an input/output (I/O) unit 20. The I/O unit 20 is provided for inputting of an alarm suppression rule through an operator 30, inputting of an alarm attribute, correction/confirmation of the result outputted from the causal relation table generating unit, and printing-out of the result. The reference numeral 21 designates a display unit including a keyboard and a mouse, and 22 a printer.

All the functions of the units 23, 24, 25, 26 and 27 can be constituted by an available computer.

The alarm suppression rule input unit 3 serves to generate alarm suppression rules by using the I/O unit through the operator 30. All alarm suppression rules may be inputted through the operator 30 or a number of general suppression rules may be prepared so that the operator 30 can select one from the rules and that alarm suppression rules can be added thereto if necessary. The latter case is useful to the operator 30. Therefore, the alarm suppression rule input unit 23 outputs information necessary for inputting an alarm suppression rule to the display unit 21.

Figure 9:
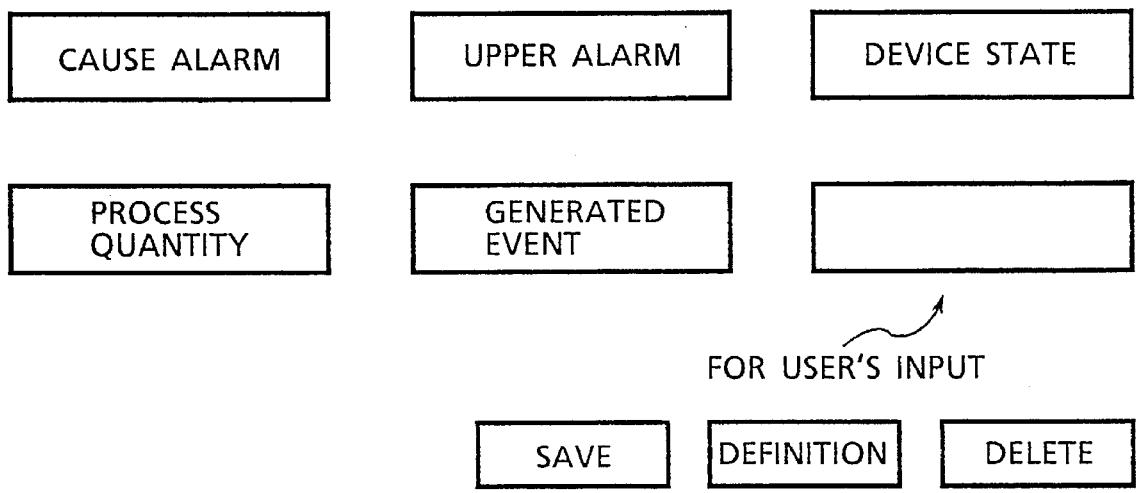
FIG. 9 is a view showing an example of display of an alarm display suppression rule information item.

As shown in FIG. 9, the alarm suppression rule input unit 3 first outputs formatted alarm suppression rule information items to the display unit 21 to display the items on the display unit 21. In FIG. 9, the framed "cause alarm" means that the display of a specific alarm is suppressed by an alarm as a cause. That is, it is assumed now that alarm "flow rate A decreases" is generated when the flow rate decreases by the stopping of a pump A which is operative during the rating operation of plant. It is assumed further that this pump is not operative at the time of starting-up of plant. If the plant is started in the aforementioned relation, alarm "flow rate A decreases" may be generated even in the case where the plant is normal. Therefore, if the cause alarm is set to "plant starting-up state" and the alarm to be suppressed is set to "flow rate A decreases", the cause alarm obeys a rule of suppressing a derivatively generated alarm so that alarm "flow rate A decreases" is suppressed at the time of starting-up of plant. The framed "upper alarm" means that multistageous alarm levels are provided for one process quantity to monitor the state of plant so that the display of a lower-level alarm is suppressed by a higher-level alarm. The framed "device state" means that a specific alarm is suppressed correspondingly to the device state. The framed process quantity means that a specific alarm is suppressed when the process quantity takes a predetermined value. The framed "generated event" means that a specific alarm is suppressed by the generated event. The blank frame is provided so that the operator 1 can define an alarm suppression rule. Using the I/O unit 20, the alarm suppression rule is supplied to the blank frame.

Specifically, when the framed "DEFINITION" in FIG. 9 is selected, the user input frame for inputting alarm suppression rule information is displayed so that an alarm suppression rule can be defined by inputting the alarm suppression rule into the frame.

In the case where an alarm suppression rule preliminarily set is unnecessary, an unnecessary alarm suppression rule information item can be deleted by selecting the framed "DELETE" while specifying the unnecessary alarm suppression rule information item by a mouse or the like.

When the framed "SAVE" in the drawing is selected after an alarm suppression rule is generated as described above, the alarm suppression rule thus generated is stored in the alarm suppression rule input unit 23. Then, the alarm suppression rule is transferred to the editor unit 26.

The editor unit 26 supplies the alarm suppression rule to the alarm attribute input unit 24. As another method, the alarm suppression rule input unit 23 may have this function so that the alarm suppression rule can be fed to the alarm attribute input unit 24 directly.

The alarm attribute input unit 24 supplies information with respect to alarm attributes to the display unit 21 so that the information is expressed by a frame constituted by "frame name", "slot name", "value" and "data form". The method of indicating the information by a frame is easy in description, addition and correction. The "frame name and "value" are information inputted by the operator 30 through the I/O unit 20. For example, AN001 is an alarm name inputted by the operator 30. Data as suppression reason information with respect to the alarm, that is, values for respective slot names, are inputted by the operator 30. In the case of FIG. 4, AN005 as an upper alarm and EV001 as a generated event with respect to AN001 are inputted. With respect to AN001, AN005 is an upper alarm, so that AN001 is suppressed by AN005. Furthermore, AN001 is suppressed by the generated event EV001.

Suppression reason information with respect to all alarm items are inputted in the same manner as described above. For example, AN005 means that there is no alarm suppression reason information. Further, information with respect to the device state, process quantity and generated event must be defined. FIG. 4 shows one generated event EV001. Other items can be defined in the same manner as described above. This is because information is defined by frame expression. If a different expression style is used, information can be defined correspondingly to the style.

When the inputting of information with respect to alarm attributes is completed, the information is recorded in the alarm attribute input unit 24 and transferred to the editor unit 26 by selecting the framed "SAVE" as shown in FIG. 9.

If no information but information with respect to alarm attributes expressed by a frame is used, a considerable time is required for detecting alarms to be suppressed and suppression reason information. To suppress generated alarms in an on-line state, it is desirable that alarms to be suppressed and suppression reason information are preliminarily directly related to each other. Therefore, the editor unit 26 performs the relating by the procedures shown in FIGS. 5A and 5B. As the steps in FIGS. 5A and 5B have been described, the description thereof is omitted. The causal relation information 28 thus generated is stored in the editor unit 26 and fed to the alarm causal relation information generating unit 27.

Figure 10:
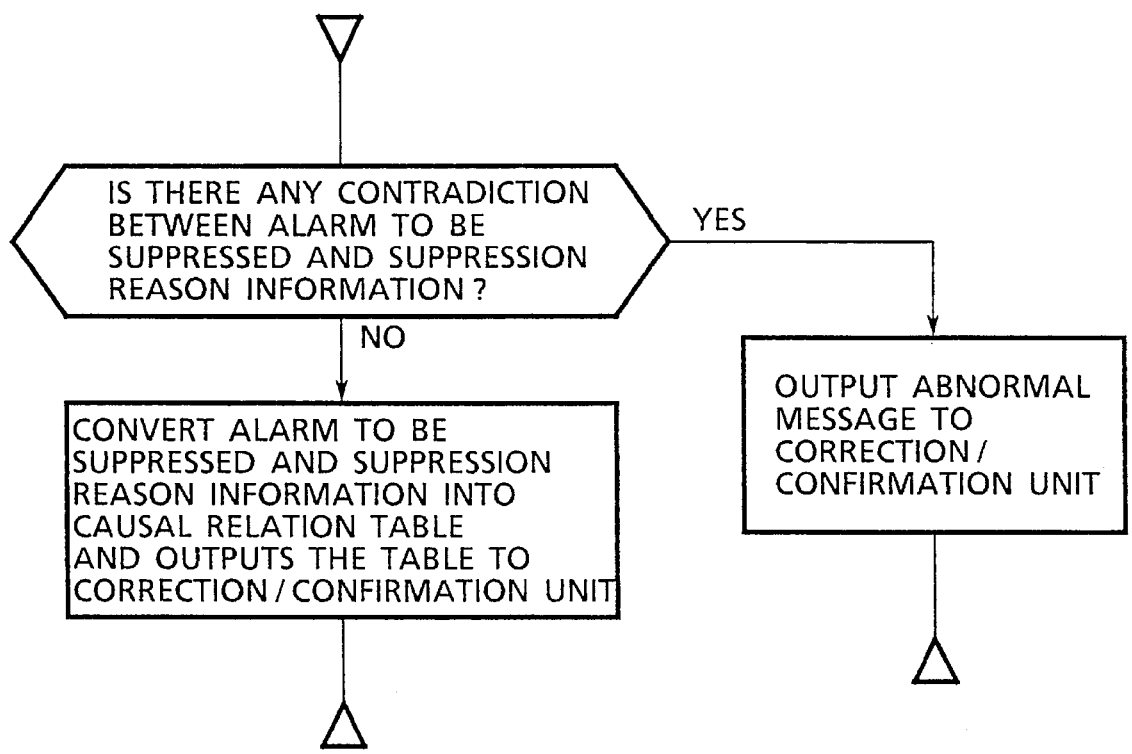
FIG. 10 is flow chart showing the causal relation information generating procedure.

The alarm causal relation information generating unit 27 may output the input causal relation information 28 as alarm causal relation information 9 or may output the causal relation information 28 after confirmation that there is no error, to improve reliability on information. Therefore, as shown in FIG. 10, the alarm causal relation information generating unit 27 checks whether the alarm to be suppressed and the suppression reason information are contradictory to each other. When, for example, an alarm number 1 is suppressed by an alarm number 5, a judgment is made as to whether the alarm number 5 is suppressed by the alarm number 1. When the judgment results contradiction, a message of abnormality is outputted to the correction/confirmation unit 25. The correction/confirmation unit 25 outputs the message of abnormality to the display unit 21 directly. The message of abnormality may be outputted directly from the alarm causal relation information generating unit 27 to the display unit 21. When the judgment results in no contradiction, the operator 30 checks the relation between the alarm to be suppressed and the suppression reason information or corrects error in the relation. Therefore, the alarm causal relation information generating unit 27 converts the alarm to be suppressed and the suppression reason information into causal relation table information and outputs the causal relation table information to the correction/confirmation unit 25.

For example, the correction/confirmation unit 25 generates a causal relation table in the format shown in FIG. 11 on the basis of the input causal relation table information and outputs the table to the display unit 21 to display it. That is, FIG. 11 shows the relation that the alarm AN001 in FIG. 4 is suppressed by the upper alarm AN005 and the generated event EV001, in the form of a table. Each of the alarm AN002 and the alarm AN003 is expressed in the form of a table in the same manner as described above.

When the operator 30 observes the display result and judges that there is no problem, the framed "SAVE" is selected so that the information is stored in the correction/confirmation unit 25 and supplied to the alarm causal relation information generating unit 27. Accordingly, the causal relation table information is not corrected in the respective units 25 and 27. As a result, the alarm causal relation information generating unit 27 outputs the stored causal relation information as alarm causal relation information. When the operator 30 judges that error arises in the causal relation table information displayed on the display unit 21, the corrected result is stored in the correction/confirmation unit 25 and outputted to the alarm causal relation information generating unit 27 by correcting the error portion directly and then selecting the framed "SAVE". The alarm causal relation information generating unit 27 converts the corrected causal relation table information into number information (for example, converts AN001 into the alarm number 1).

This correction is simple compared with the case where causal relation information is generated by inputting information with respect to alarm suppression rule and alarm attributes again. The correction has an effect in that the processing time is shortened. Of course, the generation of causal relation information may be recommenced from the beginning.

Figure 12:
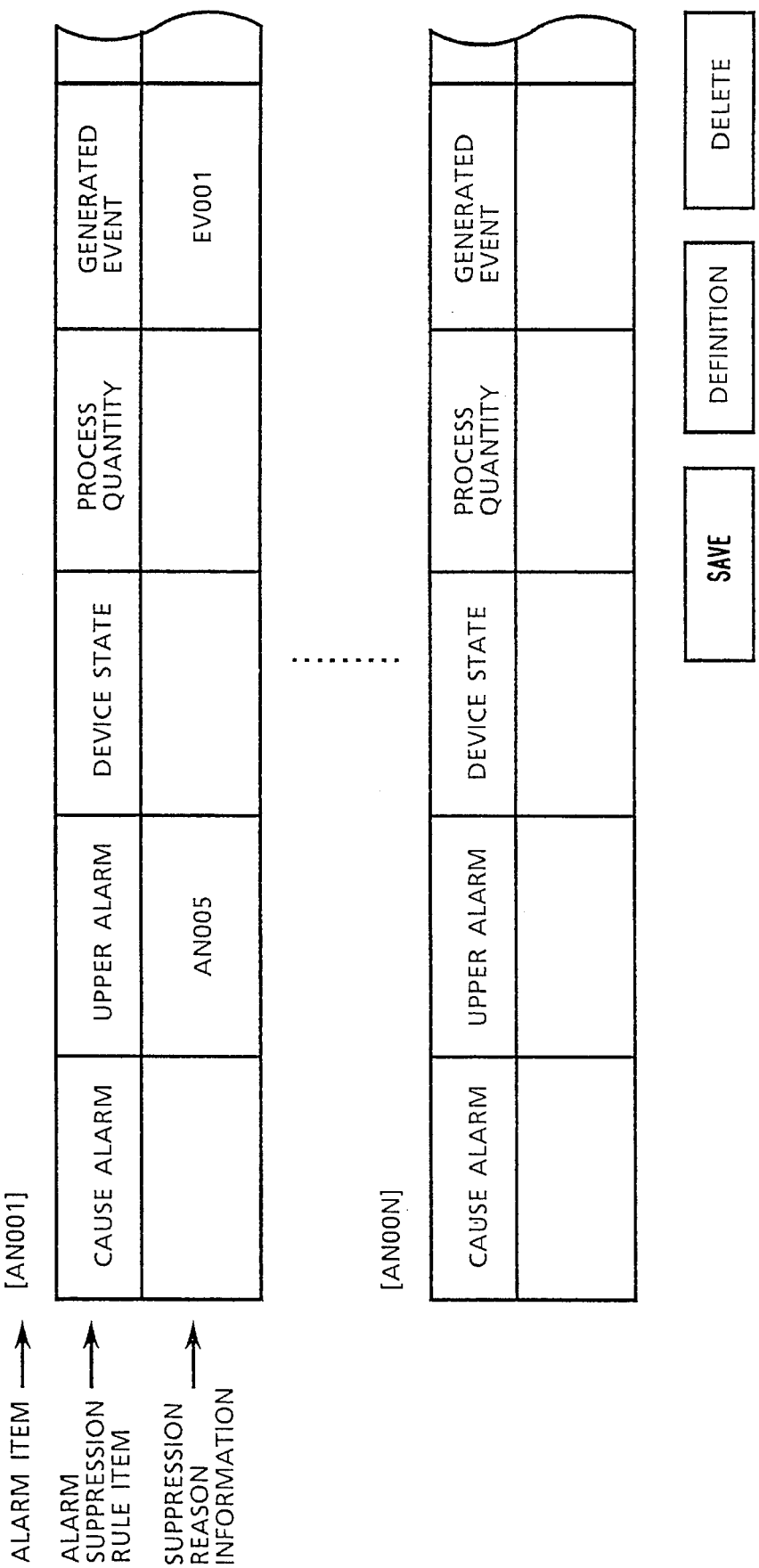
FIG. 12 is a view showing an example of display of an alarm display suppression rule and information with respective to alarm attributes.

FIG. 12 shows information with respect to alarm suppression and information with respect to alarm attributes, which are inputted in the form of a table and displayed on the display unit 21. In the drawing, alarm suppression rules are defined in the same manner as in FIG. 9. Alarms with respect to alarm attributes and suppression reason information are inputted in the same manner as in FIG. 4. In the case of FIG. 12, both the alarm suppression rule and alarm attribute information can be inputted in the form of a table on one screen, so that there arises an effect in that the user 1 can understand it easily.

Figure 13:
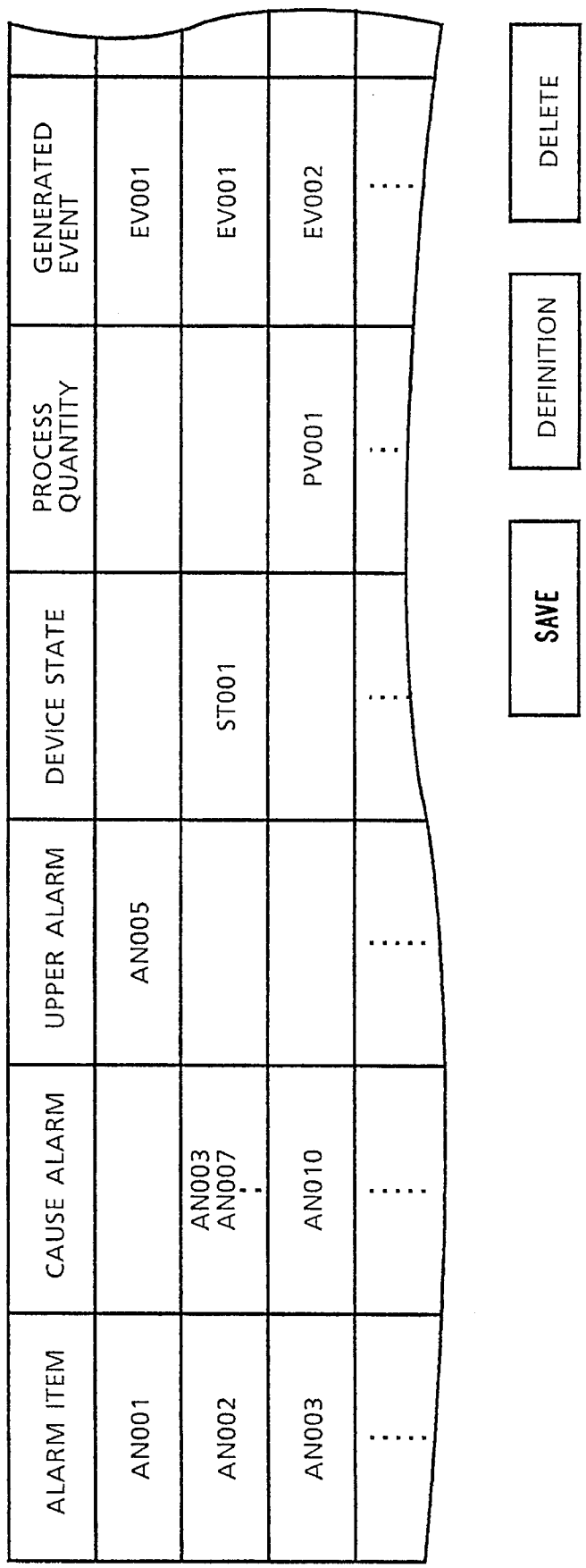
FIG. 13 is a view showing an example of display of a causal relation table.

Further, causal relation table information shown in FIG. 13 is the same as that in FIG. 11 generated by the correction/confirmation unit 25. FIG. 13 shows the case where the causal relation table is outputted to the display unit 21 from the beginning so that the operator 30 inputs alarms into the alarm columns and inputs suppression reason information into the alarm suppression rule item columns (cause alarm, upper alarm, !D!D). The "DELETE" and "DEFINITION" of alarm suppression rule items can be used in the same manner as in FIG. 9. The causal relation table information can be generated by selecting the framed "SAVE" after completing the inputting. The information is converted into number information by the alarm causal relation information generating unit 27 so that the number information is used as alarm causal relation information 29. In this case, the operator 30 inputs the alarms and the suppression reason information into the causal relation table directly from the beginning to generate the causal relation table, so that there arises an effect in that the information alarm suppression rule input unit 23, the alarm attribute input unit 24 and the editor unit 26 are unnecessary.

In the I/O unit 20, the printer 22 serves to print out the display result of the display unit 21 or the like.

Figure 14:
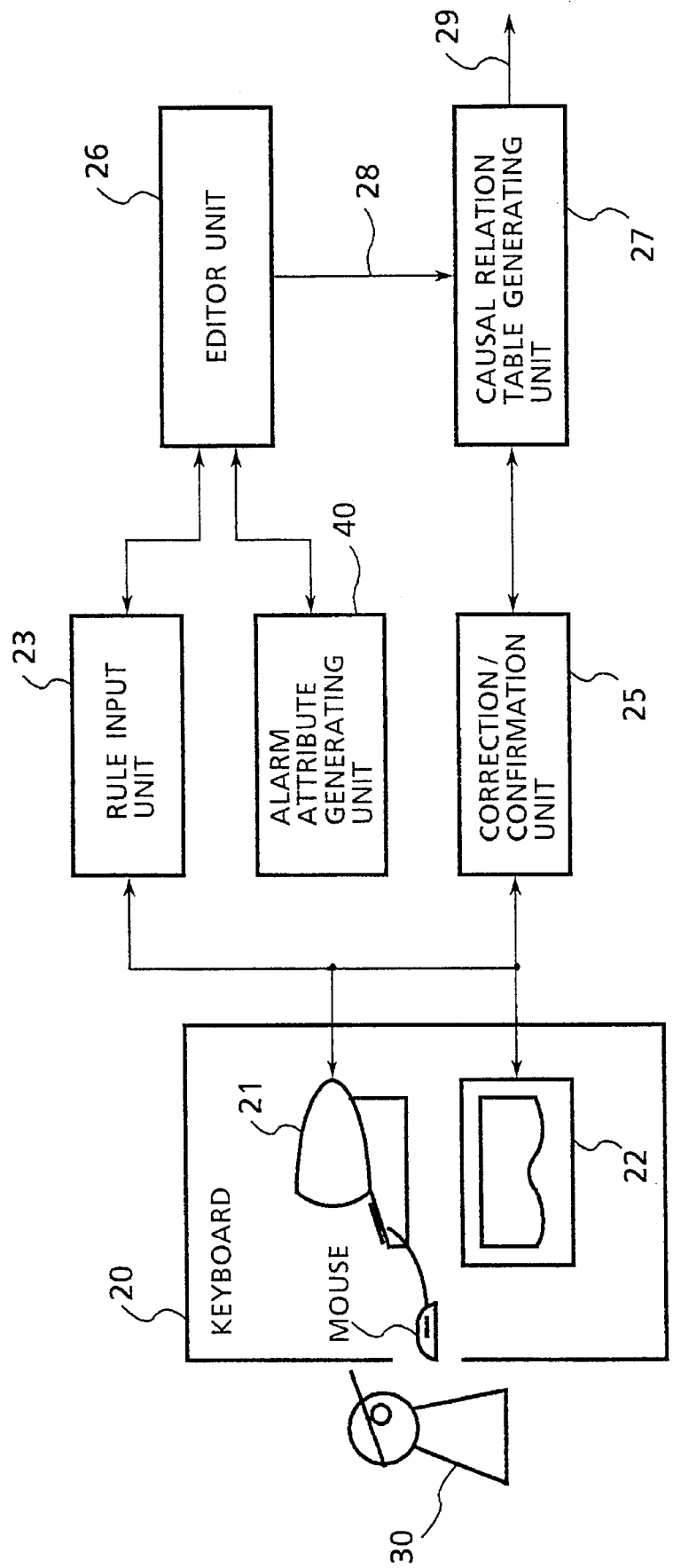
FIG. 14 is a block diagram of an alarm display suppression information generating system according to the invention.
Figure 15:
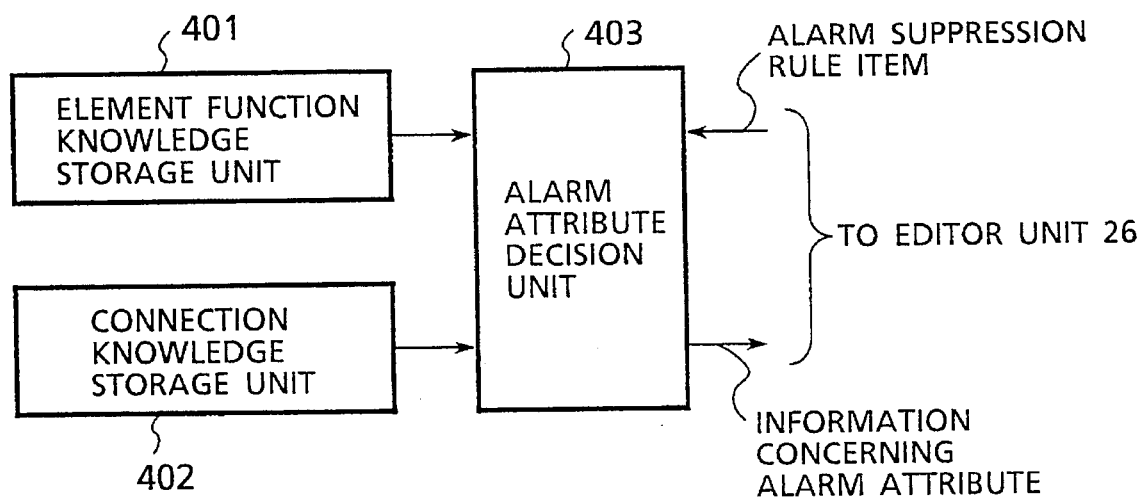
FIG. 15 is a block diagram of an alarm attribute generating unit.

FIG. 14 is a configuration diagram of an alarm display information generating system as a further embodiment of the present invention. FIG. 14 is different from FIG. 8 in that the alarm attribute input unit 24 in FIG. 8 is replaced by an alarm attribute generating unit 40 in FIG. 14. This is provided by generating information with respect to alarm attributes through the alarm attribute generating unit 40 on the basis of information with respect to the configuration and function of the plant or control system without inputting information with respect to alarm attributes through the operator 30. When an alarm suppression rule is inputted through the editor unit 26, the alarm attribute generating unit 40 generates information with respect to alarm attributes by using knowledge of a function type stored in an element function knowledge storage unit 401 and knowledge of a connection type stored in a connection knowledge storage unit 402 with respect to the item as shown in FIG. 15 and outputs the information. As a method of generating information with respect to alarm attributes, a method disclosed in "A Plant Diagnosis Method Based on the Knowledge of System Description", YAMADA and MOTODA, Journal of Information Processing, Vol. 7, No. 3, pp 143–148, November, 1984 can be used.

Figure 16:
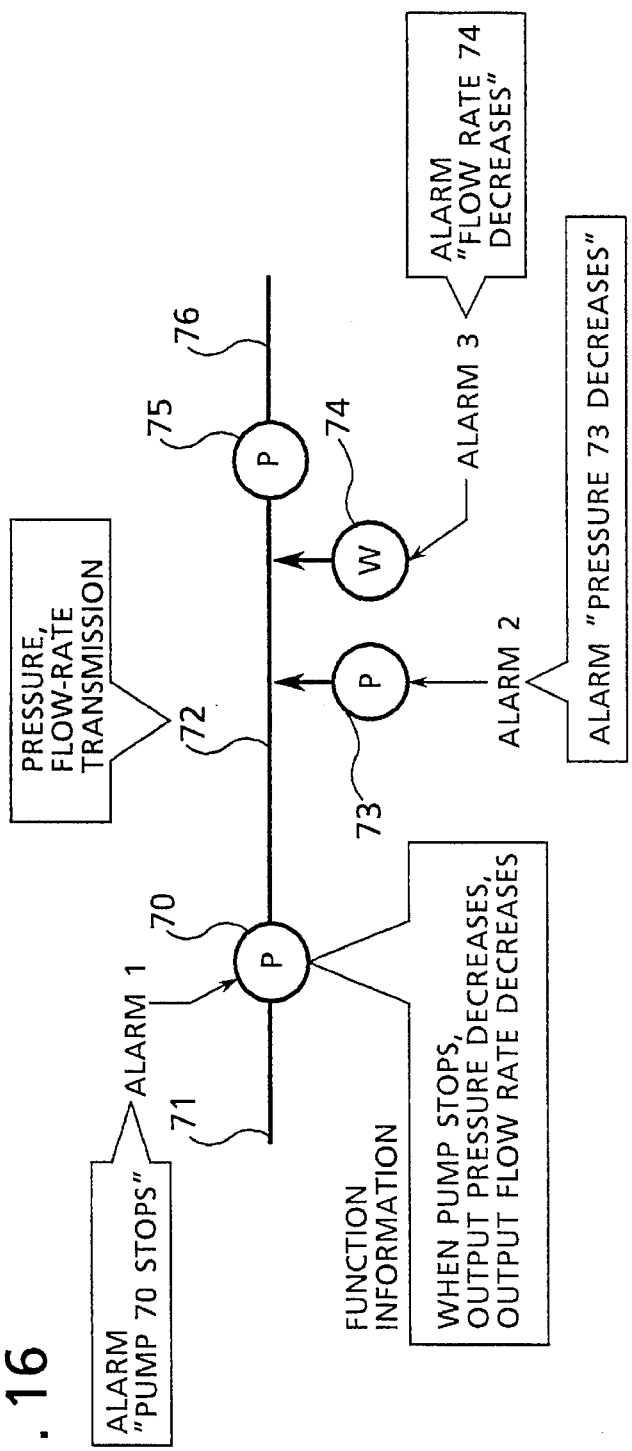
FIG. 16 is a view showing an example of the structure of plant and knowledge with respective to the configuration and function thereof.

It is assumed now that knowledge with respect to the configuration and function of plant is as shown in FIG. 16. An alarm 1 is connected to a pump 70. A piping 71 is connected to the input of the pump 70. A piping 72 is connected to the output of the pump 70. A pressure gauge 73, a flowmeter 74 and the input of a pump 75 are connected to the piping 72. A piping 76 is connected to the output of the pump 75. The alarm 1 expresses "pump 70 stops". The function of the pump 70 is defined so that both output pressure and output flow rate decrease when the pump 70 stops. An alarm 2 expresses pressure 73 decreases" and is connected to the pressure gauge 73. An alarm 3 expresses "flow rate 74 decreases" and is connected to the flowmeter 74. The piping 72 is defined to propagate both pressure and flow rate. It is apparent from the above description that when the pump 70 stops, the alarm 1 ("pump 70 stops"), the alarm 2 ("pressure 73 decreases") and the alarm 3 ("flow rate 74 decreases") are generated successively. When the alarm suppression rule is a "cause alarm" rule, it can be deduced that the occurrence of alarm 1 is a suppression reason for causing the suppression of the output of alarms 2 and 3. This result is outputted to the editor unit 26 as information with respect to alarm attributes.

Figure 17:
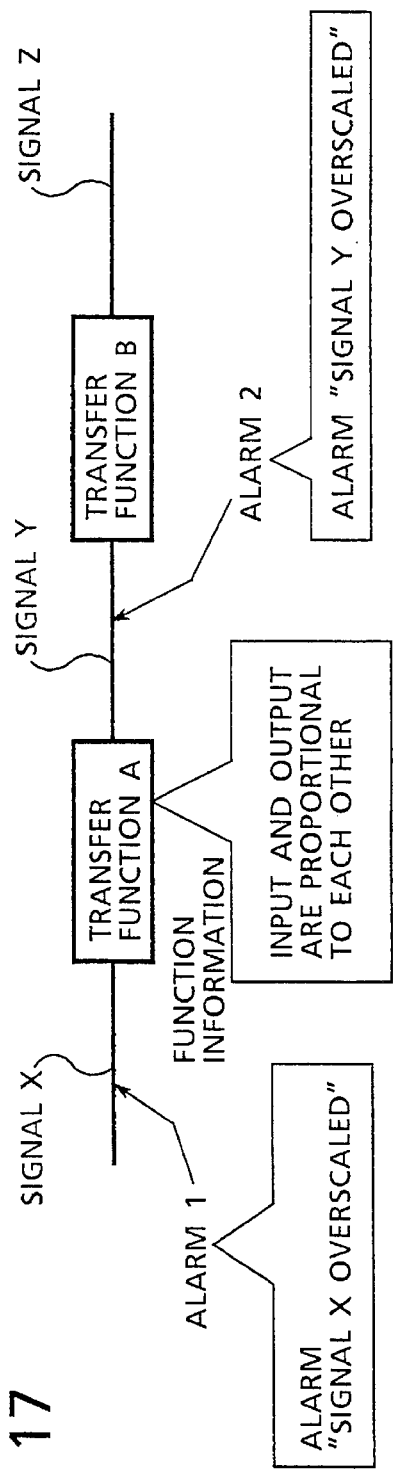
FIG. 17 is a view showing a example of the structure of a control system and knowledge with respective to the configuration and function thereof.

FIG. 17 shows an example of knowledge in the case of a control system. This control system converts a signal X into a signal Y by a transfer function A and then converts the signal Y into a signal Z by a transfer function B. In this case, the input and output of the transfer function A are proportional to each other. Also in this case, information with respect to alarm attributes can be deduced by the same procedure as in FIG. 16. In FIG. 17, when the signal X is overscaled, the alarm 1 ("signal X overscaled") is generated. Because the input and output of the transfer function A are proportional to each other, the signal Y is then overscaled so that the alarm 2 ("signal Y overscaled") is generated. It is apparent from this fact that the alarm 1 is suppression reason information for the alarm 2.

As described above, information with respect to alarm attributes can be generated automatically by using knowledge with respect to the function and connection of each element. This embodiment has an effect in that the load on the operator 30 can be lightened.

When the off-line processing unit 11 of the alarm display processing system in FIG. 1 or 6 is replaced by the alarm display suppression information generating system described with reference to FIGS. 8 through 17, alarm display suppression information can be generated by on-line processing so that the generated information can be stored in the causal relation storage unit 5 in the form of a table in FIG. 7. As the operation of the system in this case is substantially the same as that of the system in FIG. 1 or 6, the description thereof is omitted.

According to the present invention, information with respect to the alarm suppression rule and information with respect to alarm attributes are inputted to give the correspondence of causal relation to alarms to be suppressed and alarm suppression reason information for each alarm item on the basis of the two pieces of information to thereby generate alarm causal relation information for suppressing alarms.

Accordingly, not only the correspondence of causal relation between alarms due to the principle and rule of plant but alarm causal relation information due to information based on experiences of a system designer, a plant operator and so on can be generated.

The alarm causal relation information thus generated can be secured more greatly by displaying the alarm causal relation information on the display unit while relating the alarms to be suppressed to the alarm suppression reason information so that the user can correct or confirm it.

Furthermore, information with respect to alarm suppression rule, information with respect to plant and/or control system configuration and alarm items related to the information are inputted to generate alarm causal relation information while relating the alarms to be suppressed to the alarm suppression reason information for each alarm item on the basis of these pieces of information, to thereby facilitate the generation of the alarm causal relation information without the necessity of defining alarm attributes for each alarm.

The alarm causal relation information thus generated is preliminarily stored in the causal relation storage unit so that suppressible alarms with respect to generation alarms are decided by a looking-up means on the basis of the alarm causal relation information from the causal relation storage unit to thereby display the residual part of generation alarms on the display unit. Accordingly, derivatively generated alarms can be suppressed so that the residual part of alarms can be outputted just after the generation of alarms, so that an alarm processing system adapted for monitoring plant can be provided.

What is claimed is:

1. A computerized automatic alarm display processing system in a plant which outputs a plurality of alarms with respect to devices included in the plant and monitor information with respect to the devices, comprising:

display means for displaying information indicating alarms;

specifying means for specifying an alarm representing abnormal operation of one of the devices of the plant and an event which caused said specified alarm based on the monitor information;

table storage means for storing a table which includes information indicating corresponding relations between the plurality of alarms and alarm suppression reason information, each relation indicating when the display of a corresponding alarm is to be suppressed;

decision means for deciding, (i) in response to said specified alarm, said specified event and the monitor information, whether alarm suppression reason information correspondingly related to said specified alarm exists in said monitor information and said table, (ii) a kind of alarm said specified alarm is and (iii) an event which caused said specified alarm by reference to said table; and display suppression instruction means for supplying said display means with an instruction to suppress the display of said specified alarm when a decision is made that said alarm suppression reason information correspondingly related to said specified alarm exists in the monitor information and said table.

2. An automatic alarm display processing system according to claim 1, wherein said system further comprises:

means for deciding whether a predetermined time sequential order between said specified alarm and another alarm of the plurality of alarms exists based on said alarm suppression reason information; and wherein said display suppression instruction means supplies said display means with an instruction to suppress the display of said another alarm when said decision means decides that said predetermined time sequential order exists.

3. An automatic alarm display processing system according to claim 2, wherein said predetermined time sequential order is determined based on the manner in which the operation of ones of said devices, which are respectively associated with said specified alarm and said another alarm, depend on each other.

4. An automatic alarm display processing system according to claim 1, wherein said system further comprises:

means for detecting, after a predetermined time has passed since said specified alarm has been specified by said specifying means, whether said alarm suppression reason information correspondingly related to said specified alarm does not exist in said table as decided by said decision means; and means for indicating that said alarm suppression reason information does not exist in response to an output from said means for detecting.

5. An automatic alarm display processing system according to claim 1, wherein said alarm suppression reason information includes information indicative of an operating state, a process parameter quantity, and an initial event of a device which causes said corresponding one alarm.

6. A computerized automatic alarm display processing system according to claim 1 further comprising:

a table generation apparatus for generating said information included in said table, said table generation apparatus comprises:

knowledge base storage means for storing a knowledge base having attribute information for each alarm indicating parameters of an event causing said alarm, retrieval means for retrieving said attribute information from said knowledge base based on alarms specified by said specifying means, and converter means for converting the retrieved attribute information into said alarm suppression reason information correspondingly related to an alarm.

7. A computerized automatic alarm display processing system according to claim 6, wherein said table generation apparatus further comprises:

a portable storage means for storing said alarm suppression reason information correspondingly related to an alarm converted from said retrieved attribute information by said converter means.

8. A computerized automatic alarm display processing system according to claim 6, wherein said information of said knowledge base is formed as a frame.

9. A computerized automatic alarm display processing system in a plant which outputs a plurality of alarms with respect to devices included in the plant and monitor information with respect to the devices, comprising:

display means for displaying information indicating alarms;

specifying means for specifying an alarm representing abnormal operation of one of the devices of the plant and an event which caused said specified alarm based on the monitor information;

table storage means for storing a table which includes information indicating corresponding relations between the plurality of alarms and alarm suppression reason information, each relation indicating when the display of a corresponding alarm is to be suppressed;

decision means for deciding, (i) in response to said specified alarm, said specified event and the monitor information, whether alarm suppression reason information correspondingly related to said specified alarm exists in the monitor information and said table, (ii) a kind of alarm said specified alarm is and (iii) an event which caused said specified alarm by reference to said table;

display suppression instruction means for supplying said display means with an instruction to suppress the display of said specified alarm when a decision is made that said alarm suppression reason information correspondingly related to said specified alarm exists in said monitor information and said table;

alarm attribute information input means for inputting attribute information indicating parameters of an event causing each alarm;

causal relation input means for inputting a causal relation rule based on the monitor information, said specified alarm and said specified event; and conversion means for converting said attribute information into said alarm suppression reason information based on said causal relation rule to generate said table.

10. An automatic alarm display processing system according to claim 9, wherein said causal relation rule is a rule for designating alarms to be suppressed on the basis of a causal relation between a cause alarm as the origin of a series of alarms and another alarm of said series, a causal relation between an upper alarm and a lower alarm which is less important than the upper alarm, a causal relation between an operating state of each device and an alarm, a causal relation between a process parameter quantity of a process being monitored and an alarm, and a causal relation between an initial event in said process and an alarm.

11. An automatic alarm display processing system according to claim 9, wherein said system further comprises:

means for correcting said information included in said table while said table is displayed on said display means.

12. An automatic alarm display processing system according to claim 9, wherein said system further comprises:

means for deciding whether said specified alarm and said correspondingly related alarm suppression reason information are contradictory to a causal relation therebetween; and wherein said display suppression instruction means supplies said display means with an instruction to suppress the display of said specified alarm when said means for deciding decides that there is no contradiction.

13. An automatic alarm display processing system according to claim 9, further comprising:

knowledge storing means for storing information representing the structure of said plant, information about functions of the devices included in said plant, information about elements included in a control system for controlling said devices and information about functions of said elements.

* * * * *